United States Patent [19]

Song et al.

[11] Patent Number: 5,404,317
[45] Date of Patent: Apr. 4, 1995

[54] DIGITAL MEASUREMENT DEVICE

[75] Inventors: Jang-Shii Song; David Tsai, both of Hsinchu, Taiwan, Prov. of China

[73] Assignee: Industrial Technology Research Institute, Hsinchu, Taiwan, Prov. of China

[21] Appl. No.: 67,436

[22] Filed: May 24, 1993

[51] Int. Cl.$^6$ .............................................. G06F 15/20
[52] U.S. Cl. ...................................... 364/514; 364/506
[58] Field of Search ............... 364/150, 131, 134, 138, 364/506, 514; 340/825.01, 825.06, 825.5; 33/710, 784, 819, 820

[56] References Cited

U.S. PATENT DOCUMENTS 4,973,957 11/1990 Shimizu et al. ................. 364/550 X
5,208,646 5/1993 Rogers et al. ......................... 356/152

Primary Examiner—Emanuel T. Voeltz
Assistant Examiner—Edward Pipala
Attorney, Agent, or Firm—W. Wayne Liauh

[57] ABSTRACT

A digital measurement device including a personal computer on which a four port multiplexer is mounted to provide connections to a vernier calliper, an inside calliper, an outside calliper and a height gage. A central processing unit based communication interface card is mounted in the personal computer to be in electrical connection with the multiplexer for serving as a transducer to receive output signals from the vernier calliper, inside calliper, outside calliper and height gage and transmit the signals to the personal computer to have the signals processed in the personal computer.

3 Claims, 17 Drawing Sheets 5,404,317

DIGITAL MEASUREMENT DEVICE

FIELD OF THE INVENTION

The present invention relates to a digital measurement device and in particular to a digital measurement device having an easy programmable system architecture, expandable memory, low manufacturing cost, high efficiency, and operating in a multiplexing manner by utilizing a multiplexer connected to four or more channels that are capable of independently and simultaneously transmitting and receiving data.

BACKGROUND OF THE INVENTION

Conventionally, measuring instruments provide no digital or analog electrical output and the readings of the measurement instruments have to be read visually and recorded manually by users. It usually takes time and labor to do the reading and recording of the measurement data.

To overcome such an inconvenience in handling the readings of the conventional measured instruments, digital measurement instruments were developed to provide a direct connection with a computer system so as to eliminate the need of reading measurement result by eyes and recording it by hand. The digital measurement devices currently available in the market are very expensive and during operation, they allow only one channel to be activated each time. Besides, the state-of-art digital measurement instruments generally comprise a single chip architecture which limits the programmability and memory expandability thereof.

Due to the prevalent use of personal computers, it is therefore desirable to provide a digital measurement device which is embodied in a personal computer architecture, incorporating therein communication interface circuitry and peripheral interface circuitry, to provide the digital measurement device with easy programmability, memory expandability, low manufacturing cost and high efficiency and simultaneous activateablity of four or more than four channels for transmission and receipt of data.

SUMMARY OF THE INVENTION

It is therefore the principal object of the present invention to provide a digital measurement device having a personal computer system architecture, incorporating therein central processing unit (CPU) based communication interface circuitry and peripheral interface circuitry, to provide easy programmability, memory expandability, low manufacturing cost and high efficiency and simultaneous activateablity of four or more than four channels for transmission and receipt of data.

It is also an object of the present to provide a digital measurement device having a personal computer system architecture to be operated under commercial personal computer operating systems, such as MS DOS or Microsoft Windows (both of which are software products or trademarks of Microsoft Corporation).

It is also an object of the present invention to provide a digital measurement device which has electrically connected thereto at least a vernier calliper, an inside calliper, an outside calliper and a height gage for carrying out measurement of various kinds.

To achieve the above objects, there is provided a digital measurement device comprising a personal computer on which a four port multiplexer is mounted to provide connections to a vernier calliper, an inside calliper, an outside calliper and a height gage. A CPU-based communication interface card is mounted in the personal computer to be in electrical connection with the multiplexer for serving as a transducer to receive output signals from the vernier calliper, inside calliper, outside calliper and height gage and transmit the signals to the personal computer to have the signals processed in the personal computer.

BRIEF DESCRIPTION OF THE DRAWINGS

The above and other objects and advantages of the present invention will be readily apparent from the following description of a preferred embodiment taken in connection with the accompanying drawings, wherein.

DETAILED DESCRIPTION OF THE PREFERRED EMBODIMENT

Figure 1:
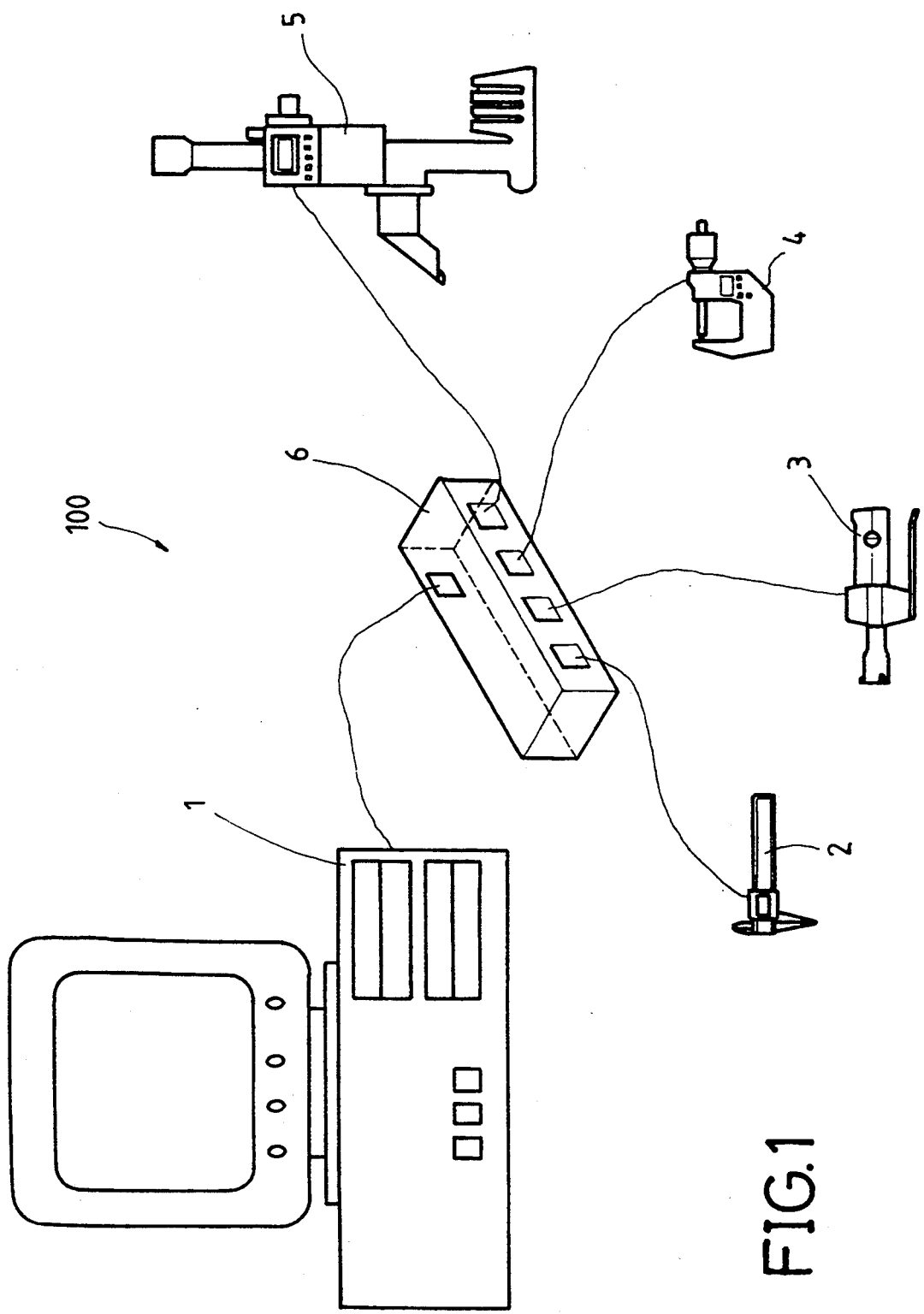
FIG. 1 is a schematic view showing the system architecture of a digital measurement device constructed in accordance with the present invention.

With reference to the drawings and in particular to FIG. 1, wherein a digital measurement device constructed in accordance with the present invention, generally designated by the reference numeral 100, is shown, the digital measurement device 100 comprises in the architecture thereof a computer 1, preferably a personal computer, with a multiplexer 6 having at least four ports connected thereto for respective connection with external measurement tools, such as a vernier calliper 2, an inside calliper 3, an outside calliper 4 and a height gage 5. It is understood that other measurement tools that generate digital measurement signals can be used in the present invention to replace any of the above-mentioned digital measurement tools. It is also understood that there can be provided more than four measurement tools with a multiplexer having more than four ports.

Figure 2:
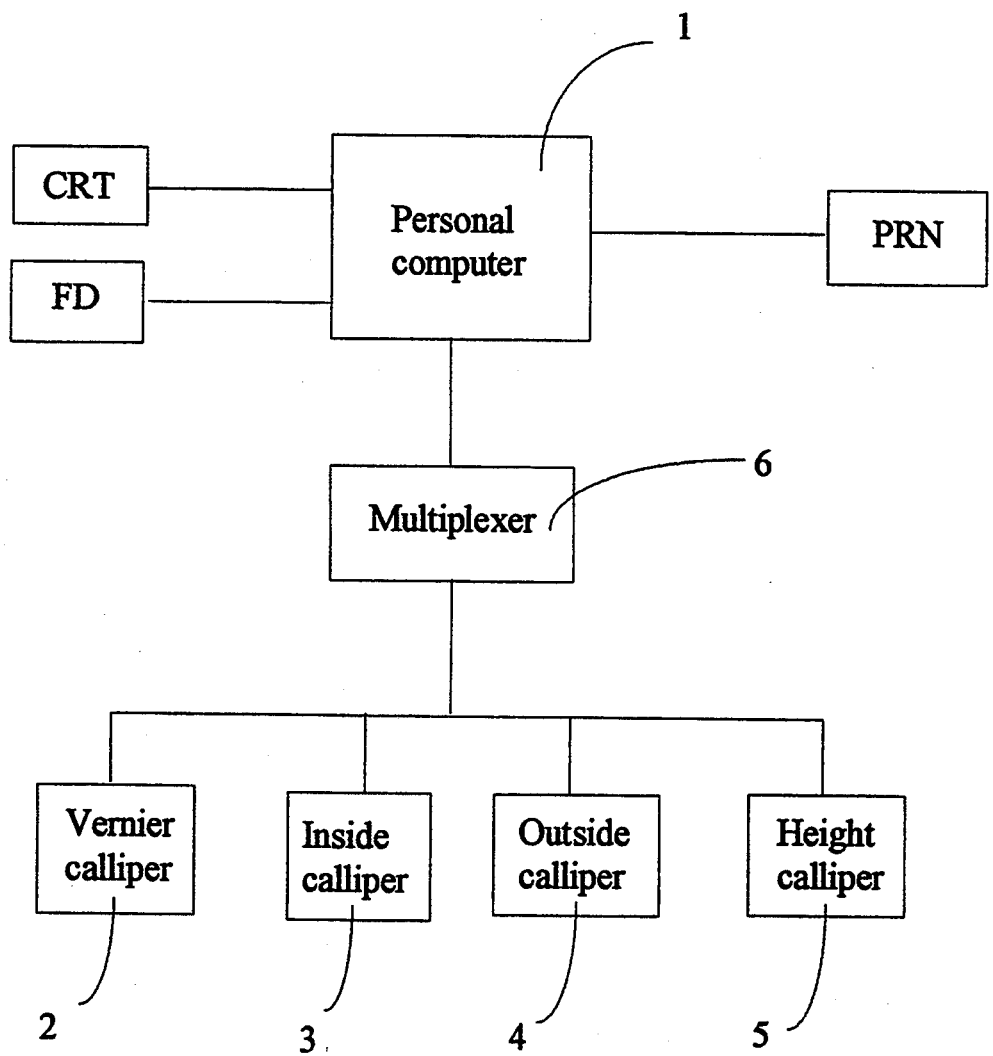
FIG. 2 is a system block diagram of the digital measurement device of the present invention.

A block diagram of the present digital measurement system is shown in FIG. 2. The personal computer 1 has a number of peripherals, such as cathode ray display (CRT) or monitor, fixed disk drive (FD) and printer (PRN), all of them are well-known to those skilled in the art of computer.

The personal computer used in the present invention further comprises a communication card 11 (FIG. 3) which has a corresponding number of input/output ports, such as the well-known RS232 port in the computer art, in electrical connection with the multiplexer 6 for respectively receiving the output signals from the measurement tools 2-5. The multiplexer 6 serves as a converter which has, for example, four ports to respectively connect to the vernier calliper 2, inside calliper 3, outside calliper 4 and the height gage 5 for the receipt and conversion of the output digital signals of these measurement tools.

In general, the output signals of the measurement tools 2-5 are in the TTL form while the RS232 ports of the communication card 11 receives only signals of RS232 standard. A conversion between signals of these two types is thus provided by the multiplexer 6.

Figure 3:
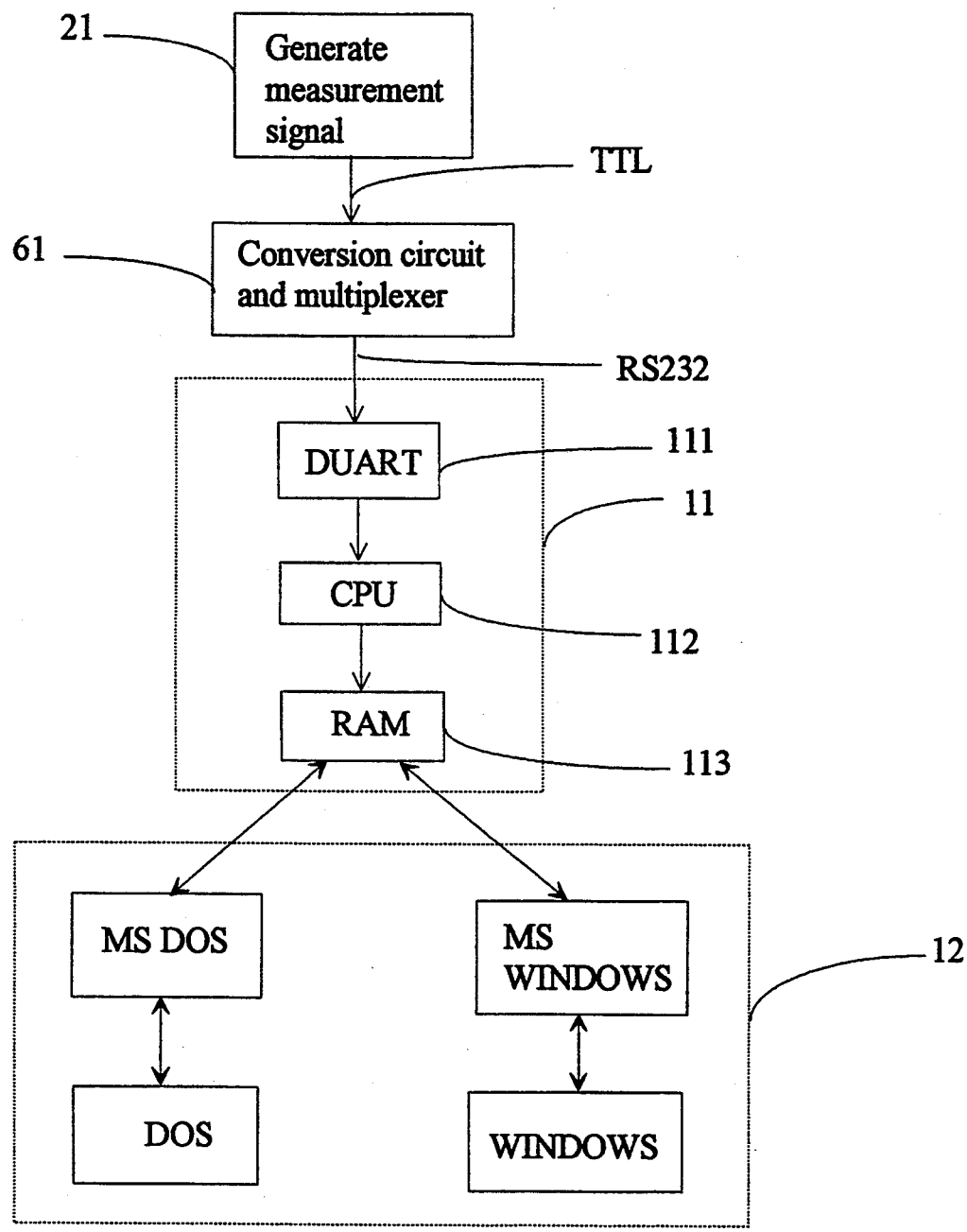
FIG. 3 is a flow chart illustrating the operation of the present invention.

An operation flow chart of the present invention is shown in FIG. 3. At step 21, the measurement signal which is in the TTL form is generated and provided by either the vernier calliper 2, the inside calliper 3, the outside calliper 4 or the height gage 5. The TTL standard signal of step 21 is then converted into an RS232 standard signal by a conversion circuit provided by the multiplexer 6 at step 61. The RS232 standard signal is then applied to the communication card 11.

In the embodiment illustrated, the communication card 11 comprises a dual universal asynchronous receiver-transmitter (DUART) circuit means 111 (FIG. 3) consisting of two integrated circuits (ICs) of UART, for example IC No. SCN2681, to provide four communication ports (RS232 ports) for connection with the four measurement tools 2-5. The communication card 11 comprises a central processing unit (CPU) 112 which repeatedly scans the four RS232 ports of the DUART to receive the input signals (which are equivalent to the measurement data provided by the measurement tools 2-5) applied to the RS232 and store the same ports to a dual port random access memory (RAM) 113 of the communication card 11.

The data stored in the RAM 113 is then accessed by application software 12 executed in the personal computer 1. In the drawings, only two kinds of software, DOS and WINDOWS, are illustrated. They are both operating system level software. Although it is intended that the present invention be embodied in the personal computer 1 under such operating systems, it is understood that other operating systems which provide the same capability as these two kinds of software can be used in the present invention.

In the example discussed herein, the personal computer 1 is operated by DOS or WINDOWS to receive and process the data provided by the measurement tools 2-5 and to allow the data to be displayed on the display (CRT) and stored in the fixed disk drive (FD) of the personal computer 1.

Figure 4:
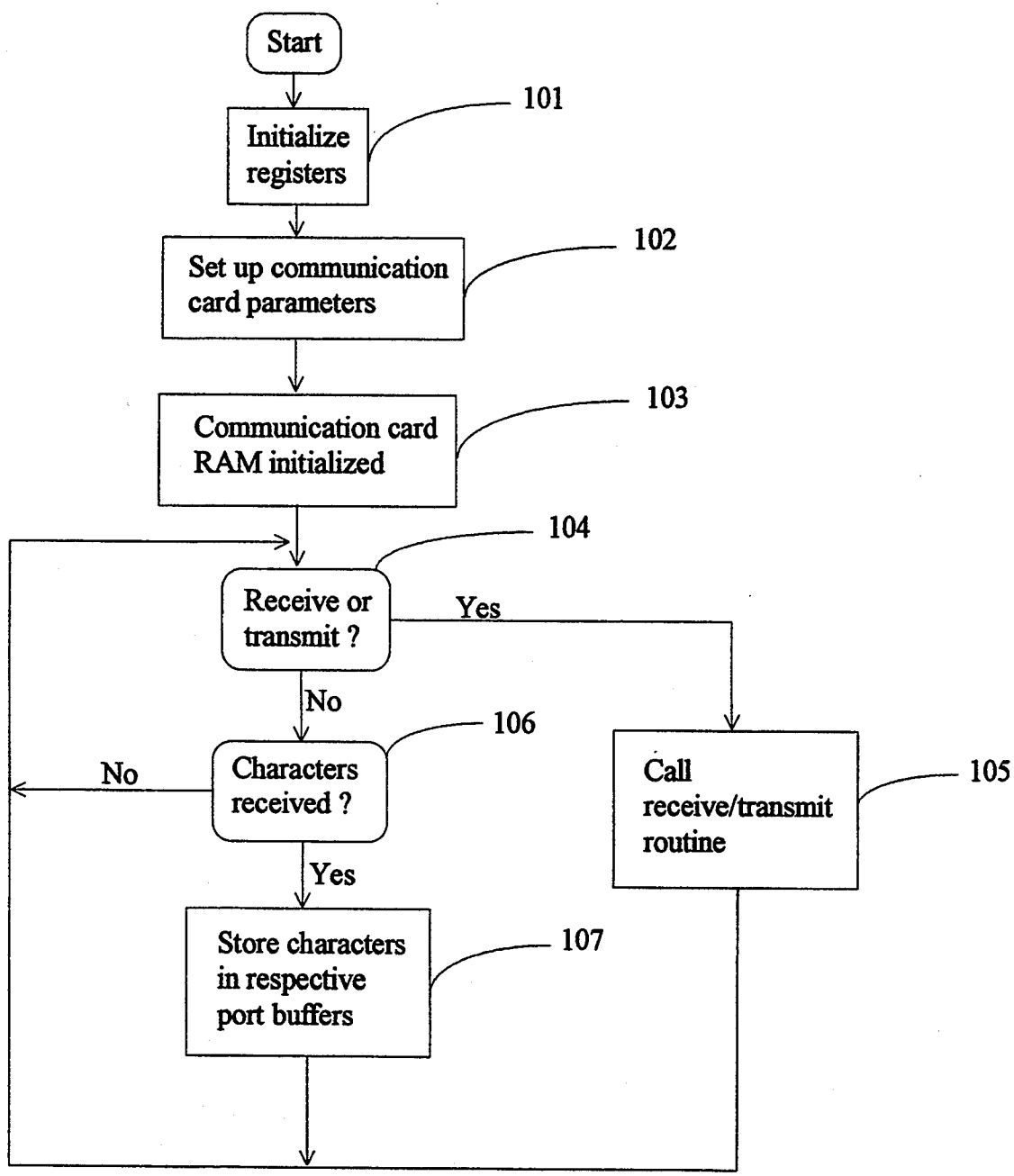
FIG. 4 is a flow chart showing the software control procedure of the present invention.

FIG. 4 is a control flow chart of the communication card 11 used in the present invention. At step 101, the registers of the communication card CPU (reference numeral 112 in FIG. 3) are initialized. The system stack parameters of the communication card 11 are set at step 102. The communication card RAM (reference numeral 113 in FIG. 3) is initialized at step 103. At step 104, it is determined if it is necessary needs to carry out the receiving/transmitting service. If yes, call for the receiving/transmitting routine at step 105. Otherwise, at step 106, check if characters are received at the RS232 ports of the DUART (reference numeral 111 in FIG. 3). If characters are received, then store the characters in the corresponding buffers of the ports at step 107. If not, returned to step 104.

In the system shown in FIG. 1, the four measurement tools 2-5 are connected to the personal computer 1 via the four RS232 ports provided by the communication card 11. In the example discussed herein, the vernier calliper 2 and the inside calliper 3 require an additional interface circuit to establish an appropriate connection with the personal computer 1, while the outside calliper 4 and the height gage 5 do not. This is due to the characteristic of these commercially available tools and in general constituting no part of the basic concept of the present invention. However, to provide a fuller understanding of the present invention, the additional interface circuits of the vernier calliper 2 and the inside calliper 3 will be briefly described hereinafter.

Figure 5:
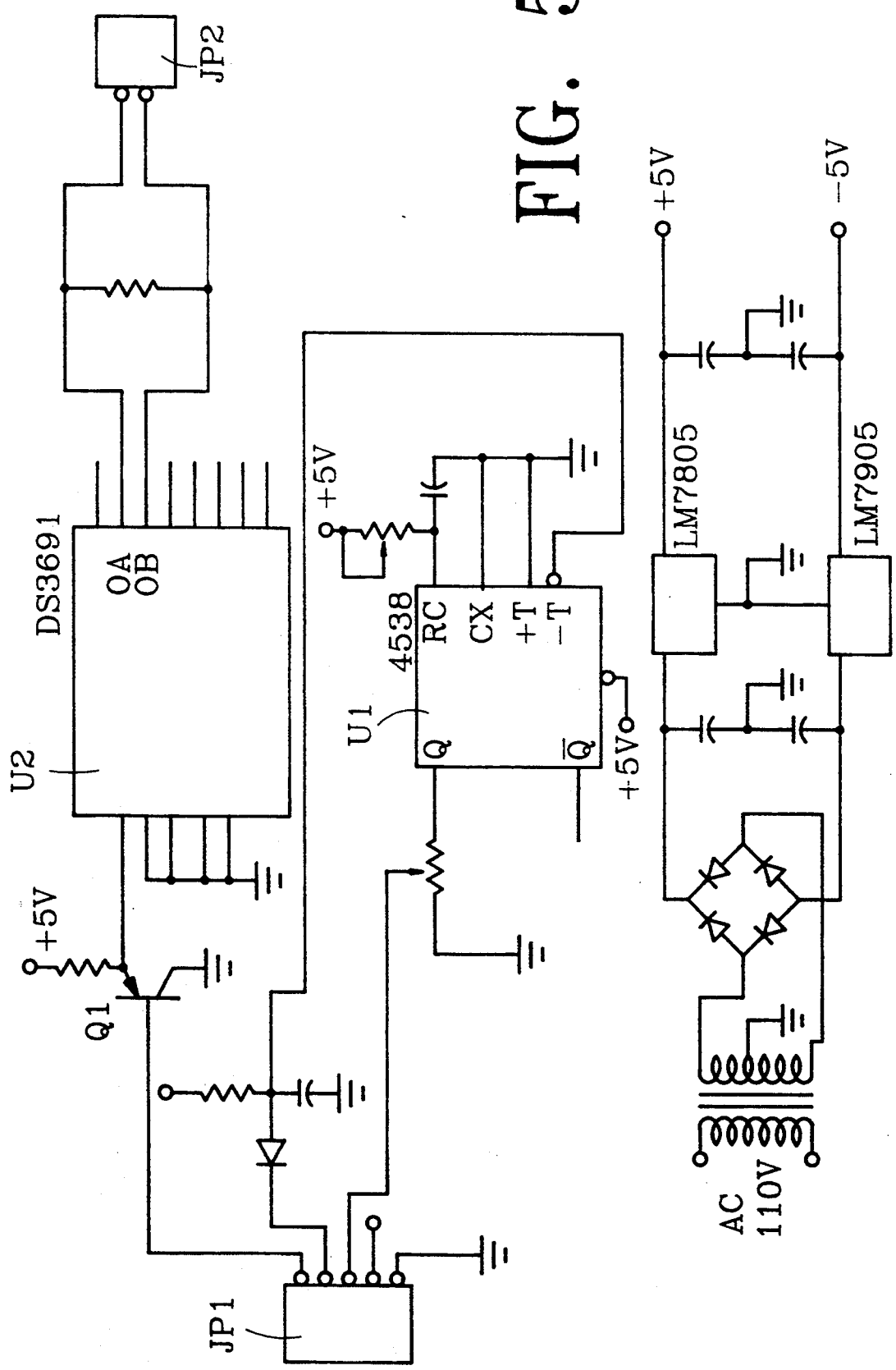
FIG. 5 is a circuit diagram of the vernier calliper interface incorporated in the present invention.

An example of the interface circuit for the vernier calliper 2 will be described in connection with FIG. 5 wherein the vernier calliper 2, which is not shown in this figure, is connected to the interface circuit via a header JP1. The header JP1 is connected to a data receiving key (not shown) of the vernier calliper 2 so that when the data receiving key is actuated, a negative pulse is generated and applied to a T trigger terminal of a monostable multivibrator U1 which in turn generates a pulse output from an output terminal Q thereof. The output pulse is then applied back to the header JP1 for triggering the vernier calliper 2 to sent out digital measurement data signal to the header JP1. The measurement data signal is amplified by a transistor Q1 and then sent to a level convertor U2 to have the amplified signals converted to one in a suitable signal level. Thereafter the modified signal is output to the multiplexer 6.

Figure 6:
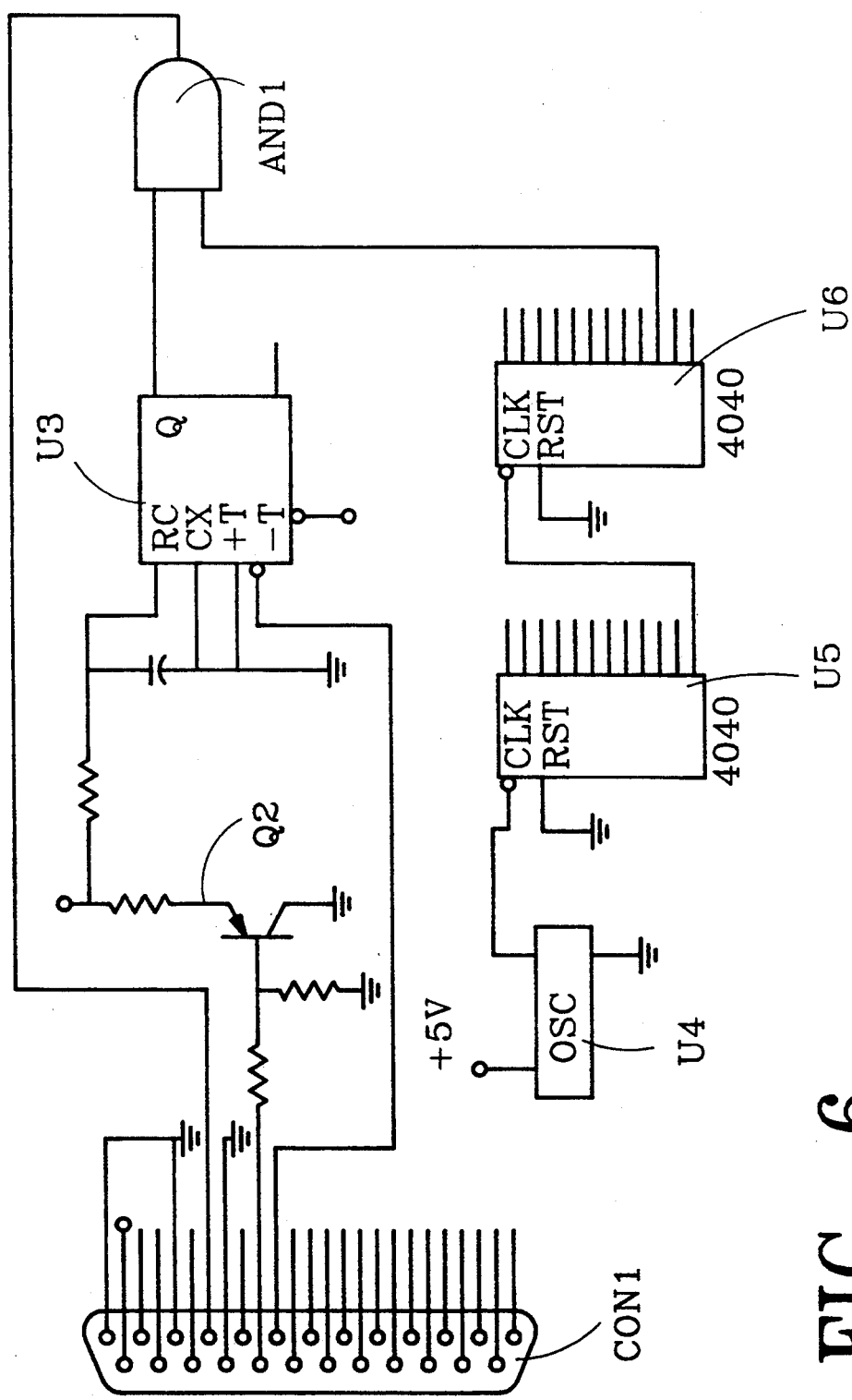
FIG. 6 is a circuit diagram of the inside calliper interface incorporated in the present invention.

Similarly, an example of the interface circuit for the inside calliper 3 is shown in FIG. 6 wherein a data receiving key of the inside calliper 3 (not shown in FIG. 6) is used to activate a connector CON1 to generate a negative pulse. The negative pulse is inverted by a transistor Q2 for triggering a monostable multivibrator U3 which generates a positive pulse in an output terminal Q thereof. The output at terminal Q of the monostable multivibrator U3 is connected to an input of an AND gate AND1. The AND gate AND1 has a further input which receives signal from an oscillator U4 divided by a frequency dividers U5 and U6 so as to generate at the output of the AND gate AND1 an output signal of 0.95 Hz. It can be understood from the illustrated circuit that when the data receiving key is depressed, a positive pulse is generated to trigger the inside calliper 3 to send out a data stream to the communication card 11 via the multiplexer 6.

To provide a better understanding to the communication card 11, a description of an embodiment thereof will be given with reference to FIGS. 7–14.

Figure 7:
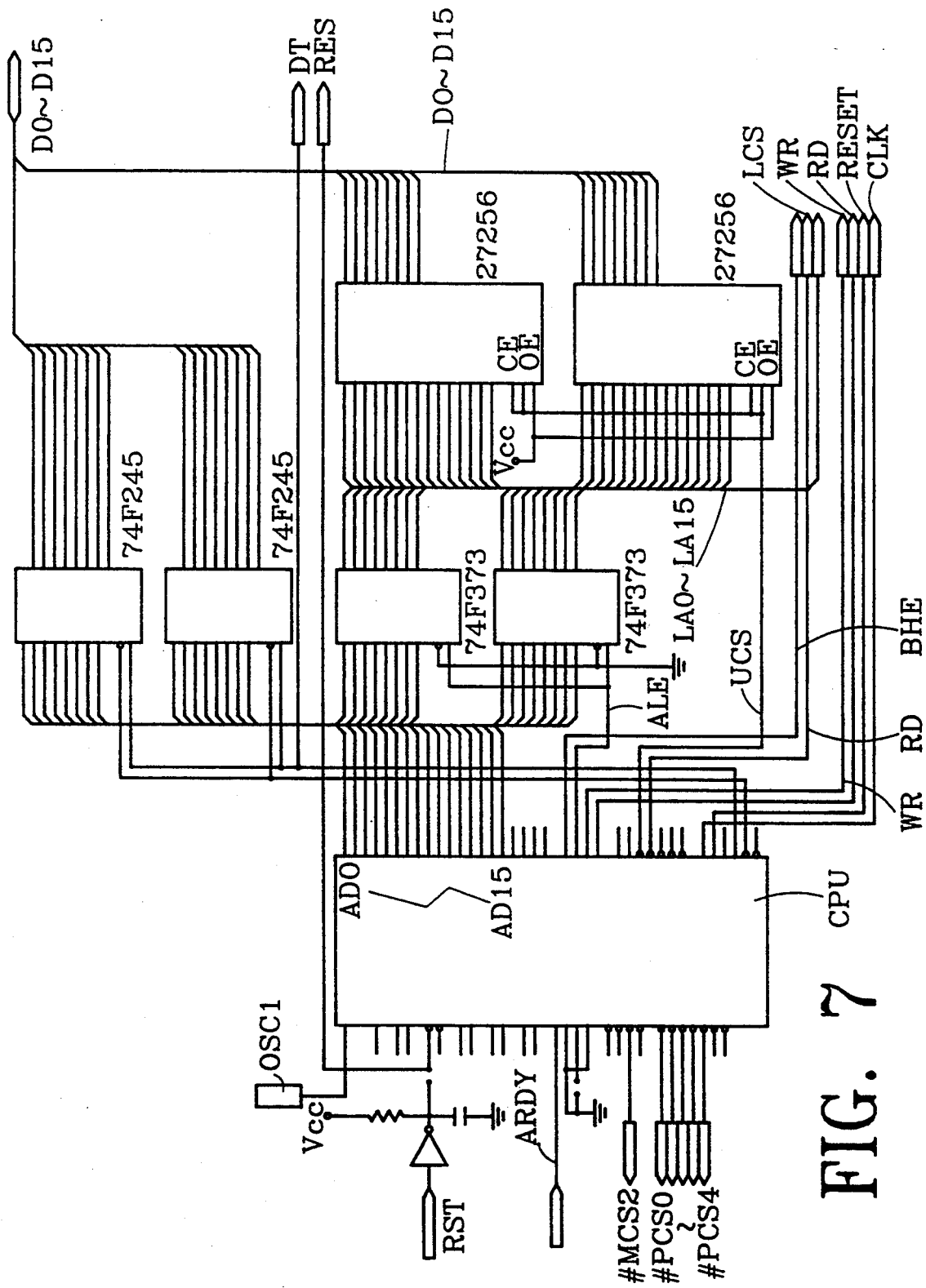
FIG. 7 is a circuit diagram of the CPU-based communication interface incorporated in the present invention.

In the exemplary circuit of the communication card 11 shown in FIG. 7, the CPU (which is designated by the numeral 112 in FIG. 3) of the communication card 11 is an INTEL 80C186 CPU (INTEL is a trademark of intel corporation) which is a highly integrated CHMOS 16-bit microprocessor having two operation modes, enhanced mode and compatible mode. When operated under the enhanced mode, the INTEL 80C186 CPU provides functions of dynamic random access memory (DRAM) refreshing, power-saving operation and interface for direct connection with floating point co-pressor. When operated under the compatible mode, the INTEL 80C186 CPU provides the same functions as an NMOS 80186 CPU does, except the direct connection interface for the numerical aided processor. The 80C186 CPU has the following functions:
1. timing pulse generator
2. two independent direct memory access (DMA) channels
3. programmable interrupt controller
4. three programmable 16-bit timers
5. DRAM refreshing control unit
6. programmable memory and peripheral chip selection logic
7. programmable wait state generator
8. local bus controller
9. power-saving operation
10. system level test support In the embodiment shown in FIG. 7, the CPU which is designated by numeral 112 in FIG. 3 uses a 32 MHz quartz oscillator OSC1 to provide the basic system oscillation frequency thereof. This oscillation frequency is divided by two to provide a 16 MHz system clock. The CPU uses four 16 MHz clock cycles, respectively designated by T1, T2, T3 and T4 in sequence, to execute each read or write command. Each one of the four clock cycles substantially occupies 63 nanoseconds.

The CPU has the following peripheral circuits connected thereto:
1. erasable programmable read only memory (EPROM) circuit
2. program static random access memory (SRAM) circuit
3. dual port RAM (DPRAM) circuit
4. DUART circuit These circuits will be described hereinafter:

EPROM CIRCUIT

As shown in FIG. 7, the communication card 11 comprises two EPROMs, IC No. 27256, to store system operation programs or other software. Each of the 27256 EPROMs has an access speed of 120 nanoseconds and a memory space of 32 Kbytes. The system operation programs built in the EPROMs include at least a boot error detection program and a peripheral chip parameter initialization program. When the CPU is switched on or receives a RESET signal, the CPU will retrieve commands from the EPROMs to start the boot error detection procedure.

The CPU activates the address latch enable (ALE) line and the upper chip select (UCS) line thereof at the first clocking cycle T1 and applies the address to the address bus (AD15-AD0) thereof. The EPROM circuit comprises two latches, IC No. 74F373, connected to the CPU which latch the address corresponding to the ALE signal when the CPU de-activates the ALE signal at the rising edge of T1 so that an address stably exists in the address bus. The CPU stops sending address signal when it de-activates the ALE line.

At the falling edge of T1, the CPU samples the ARDY line thereof to determine if a time extension for memory access is needed. However, since the access speed of the EPROMs is 120 nanoseconds and since the CPU can set any desired wait state, there is no need to use the ARDY line to extend the memory access time.

Thereafter, the CPU reads the signal indicating read (RD) line active to enable the EPROMs to apply data to the data bus of the CPU. At the falling edge of T3, the CPU copies the data in the data bus into the internal registers thereof. At T4 cycle, the CPU de-activates the RD and UCS lines and thus ending the read cycle. In the drawings, the address bus is designated by lines LA0–LA15 and the data bus is lines D0–D15.

PROGRAM SRAM CIRCUIT

The reading of data in this circuit is similar to that of the EPROM circuit. The communication card 11 comprises two 32 Kbyte SRAMs respectively for the storage of high byte and lower byte of a signal and accordingly, there are in total 64 Kbytes of SRAM space. The access speed of the SRAMs is 80 nanosecond. The CPU also has a low chip select (LCS) line for the provision of a selection signal of the low byte memory chip. A low state of the LCS line indicates that the CPU is about to access the low byte memory.

In the EPROM circuit, the two EPROMs have chip enable (CE) lines and output enable (OE) lines connected together, for the EPROMs have only read action, no write action. While in the SRAMs, the high byte and low byte must be definitely distinguished in writing data and the write enable (WE) pin of each of the SRAMs must be decoded separately.

A low state exists at the same time in both the LA0 line and the WR line of the CPU indicates the CPU is about to write to the low byte memory. When the WR line of the CPU and the BHE line are both at low state, the CPU is going to write to the high byte memory. A tri-state transmission gate, IC No. 7432, is used to provide the high and low byte write signals.

DPRAM CIRCUIT

This circuit provides a storage space common to both the communication card CPU and the bus of the personal computer, which will be abbreviated PC BUS hereinafter. Two 32 Kbyte SRAMs are included in this circuit to provide a total 64 Kbyte storage space. The access of the PC BUS to the DPRAM is done by directly access the memory itself, not via the control of the I/O (input and output) port thereof.

Figure 8:
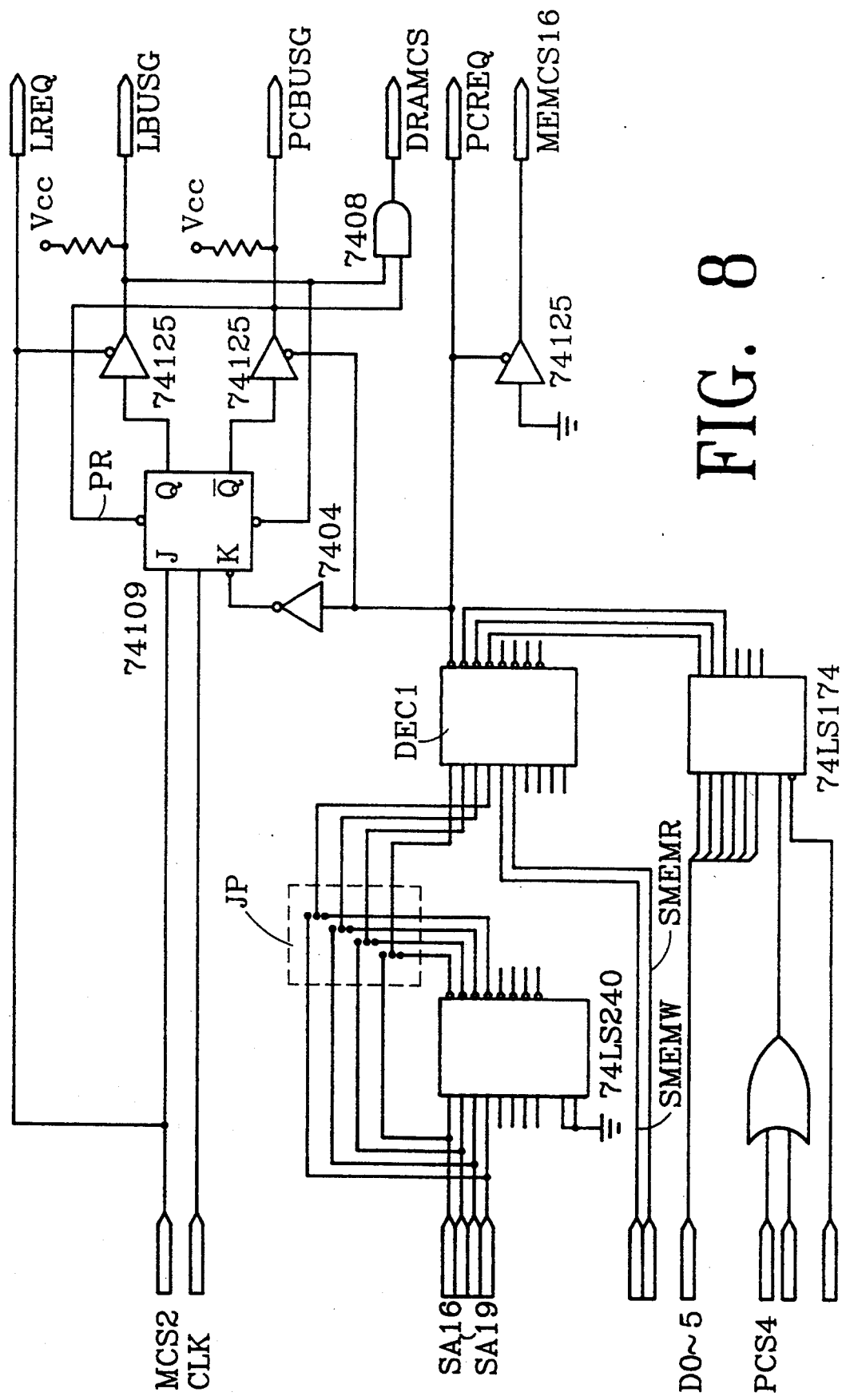
FIG. 8 is a circuit diagram of the dual port random access memory (RAM) incorporated in the present invention.

The PC BUS sends out an address line signal first and then sends out an SMEMR signal to read or an SMEMW signal to write. As shown in the embodiment of FIG. 8, a tri-state buffer, IC No. 74LS240, and a selector JP are used to select the SA19-SA16 active regions, which are sent, along with the SMEMR and SMEMW signals, to a decoder DEC1 to obtain PCREQ signal which serves as a request signal for the PC BUS to access the DPRAM.

There is provided a flip-flop, IC No. 74LS174, in the circuit to serve as an external register for the CPU which is writable by the CPU via the PCS4 pin of the CPU. The decoder compares the data written in the register with the settings of the selector JP. The PC BUS is allowed to access the DPRAM when the result of comparison is positive.

The decoded PCREQ signal is applied to the CONTROL pin of a tri-state buffer, IC No. 74125, to allow the tri-state buffer 74125 to output a low state signal MEMCS16 to inform the PC BUS that the current transmission of the memory cycle is in a 16-bit form.

The central portion of the circuit comprises a J-K flip-flop, IC No. 74109, and a tri-state buffer 74125 both of which are used to determine the priority of the CPU and the PC BUS for accessing the DPRAM. When the CPU needs to access the DPRAM, the CPU activates a MCS2 line, which serves as a LREQ signal to indicate that the CPU requests to access the DPRAM. If the PC BUS needs to access the DPRAM, it activates the PCREQ line. After being inverted, the PCREQ signal, as well as the LREQ signal, if existing, will be sent to the K input pin of the J-K flip-flop 74109. The determination circuit constituted by the J-K flip-flop 74109 and the tri-state buffer 74125 determines which of the PC BUS and the CPU obtains the priority in accordance with the time when the PCREQ and LREQ signals are generated. A priority signal LBUSG (local bus grant) or PCBUSG (PC BUS grant) will be provided to the one of the requests that is generated earlier.

Figure 9:
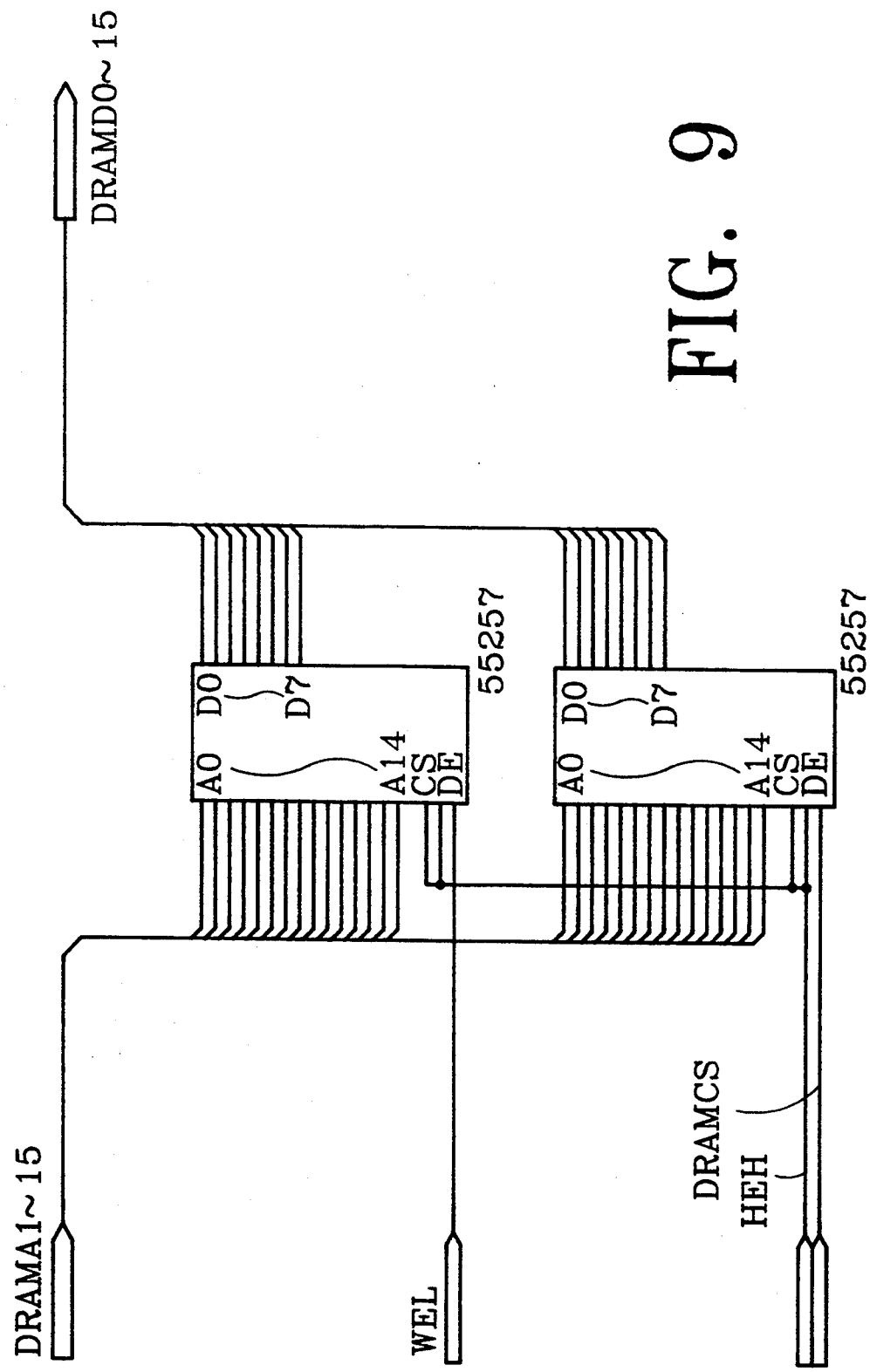
FIG. 9 is a circuit diagram of the dual static random access memory (DSRAM) incorporated in the present invention.

The priority signals LBUSG and PCBUSG are applied to an AND gate, IC No.7408, to provide a DRAMCS (dual port RAM chip select) which is connected to the CS and OE pins of two SRAMs U15 and U16, shown in FIG. 9 to provide a chip select signal. FIG. 9 shows a DS RAM circuit of the present invention.

Figure 10:
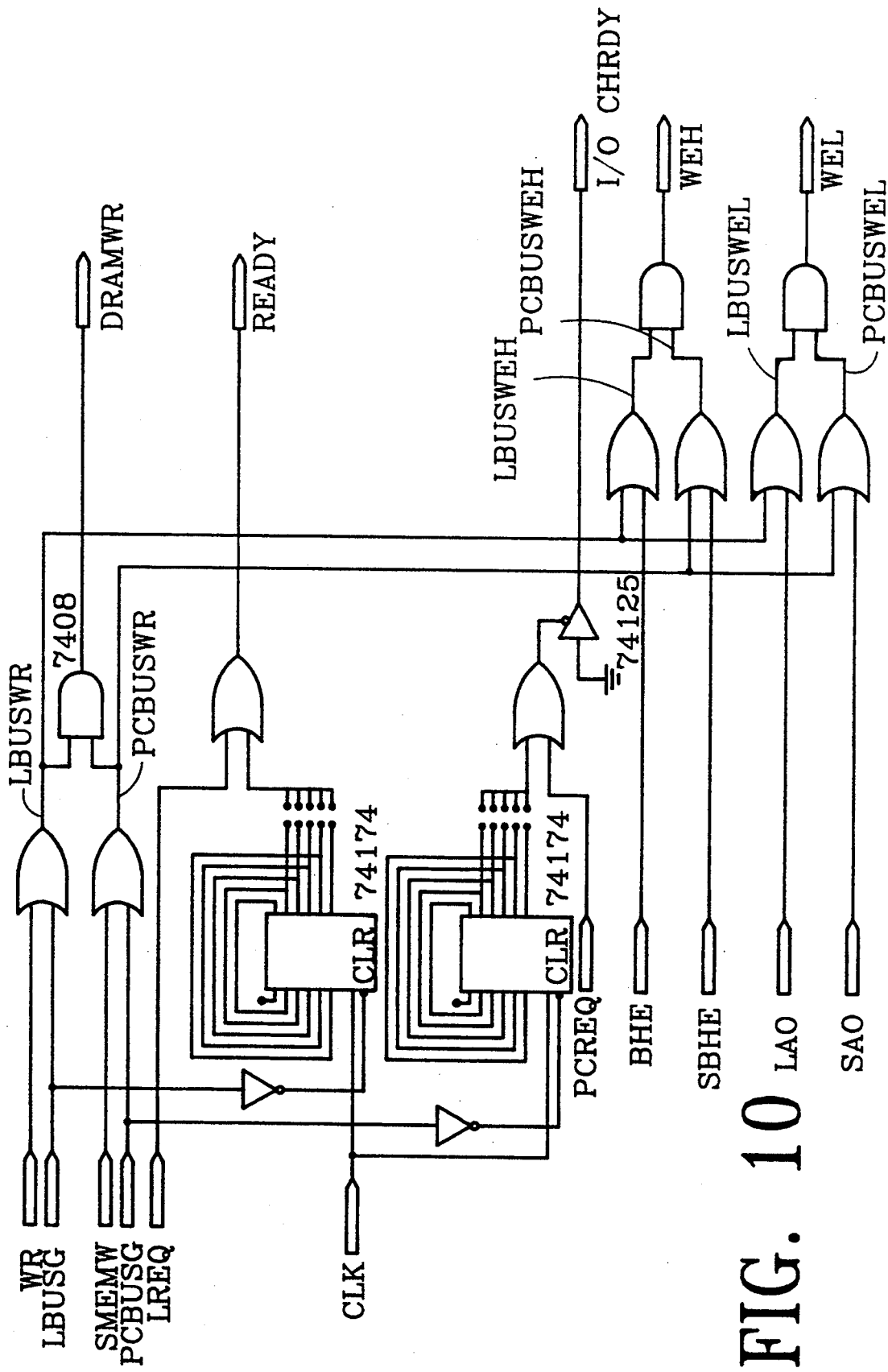
FIG. 10 is a circuit diagram showing the control signal generation circuit of the dual port random access memory (DPRAM) of the present invention.

FIG. 10 illustrates a control signal generation circuit of the DPRAM. The control signals include DRAMWR, READY, I/O CHRDY, WEH and WEL. These control signals will be respectively described. The WR and LBUSG signals are applied to an OR gate to provide an LBUSWR signal and the SMEMW and PCBUSG are applied to an OR gate to provide a PCBUSWR signal. The LBUSWR and PCBUSWR signals are then applied to an AND gate, IC No. 7408, to generate a DRAMWR signal. The LBUSWR signal is also applied to an OR gate, together with the BHE signal, to generate an LBUSWEH signal. The LBUSWR signal is also applied to an OR gate, together with the LA0 signal, to generate an LBUSWEL signal. On the other hand, the PCBUSWR signal is also applied to an OR gate, together with the SBHE signal, to generate a PCBUSWEH signal. The PCBUSWR signal is also applied to an OR gate, together with the SA0 signal, to generate a PCBUSWEL signal. The PCBUSWEL and the LBUSWEL signals are then sent to an AND gate, IC No. 7408, to generate the DPRAM high byte write enable signal WEH. The PCBUSWEL and the LBUSWEL signals are sent to another AND gate 7408 to generate the DPRAM low byte write enable signal WEL.

When the PC BUS is accessing the DPRAM, the PC BUS will check the state of the I/O CHRDY line. If the I/O CHRDY is in low state, it indicates that an access cycle of the DPRAM has not yet ended and the PC BUS will add wait states to the memory cycle until the I/O CHDRY switches to high state. By transmitting the PCBUSG signal through an invertor, IC No. 7404, a clear signal CLS can be applied to a D flip-flop, IC No. 74174. Normally, the PCBUSG is in high state so that the output of the D flip-flop 74174 will be cleared. Further, when the PCREQ is in high state, the control input of a tri-state buffer 74125 will be in high state so as to turn off the tri-state buffer 74125 and the output thereof is floating. Once a request is sent via the PCREQ line, the output state of the tri-state buffer 74125 will be in low state. Therefore, once the PC BUS finds that the I/O CHRDY is in low state, it will repeatedly add wait states to the memory cycle thereof. The access cycle of the PC BUS will be ended only when a pre-set time limit determined by the determination circuit is exceeded. Here, the D flip-flop 74174 is used to generate the wait state. The situation is similar for the access of the CPU to the DPRAM. The READY signal is applied to the ARDY pin of the CPU to indicate if the memory access cycle is completed. The generation of the READY signal is similar to that of the I/O CHRDY signal.

Figure 11:
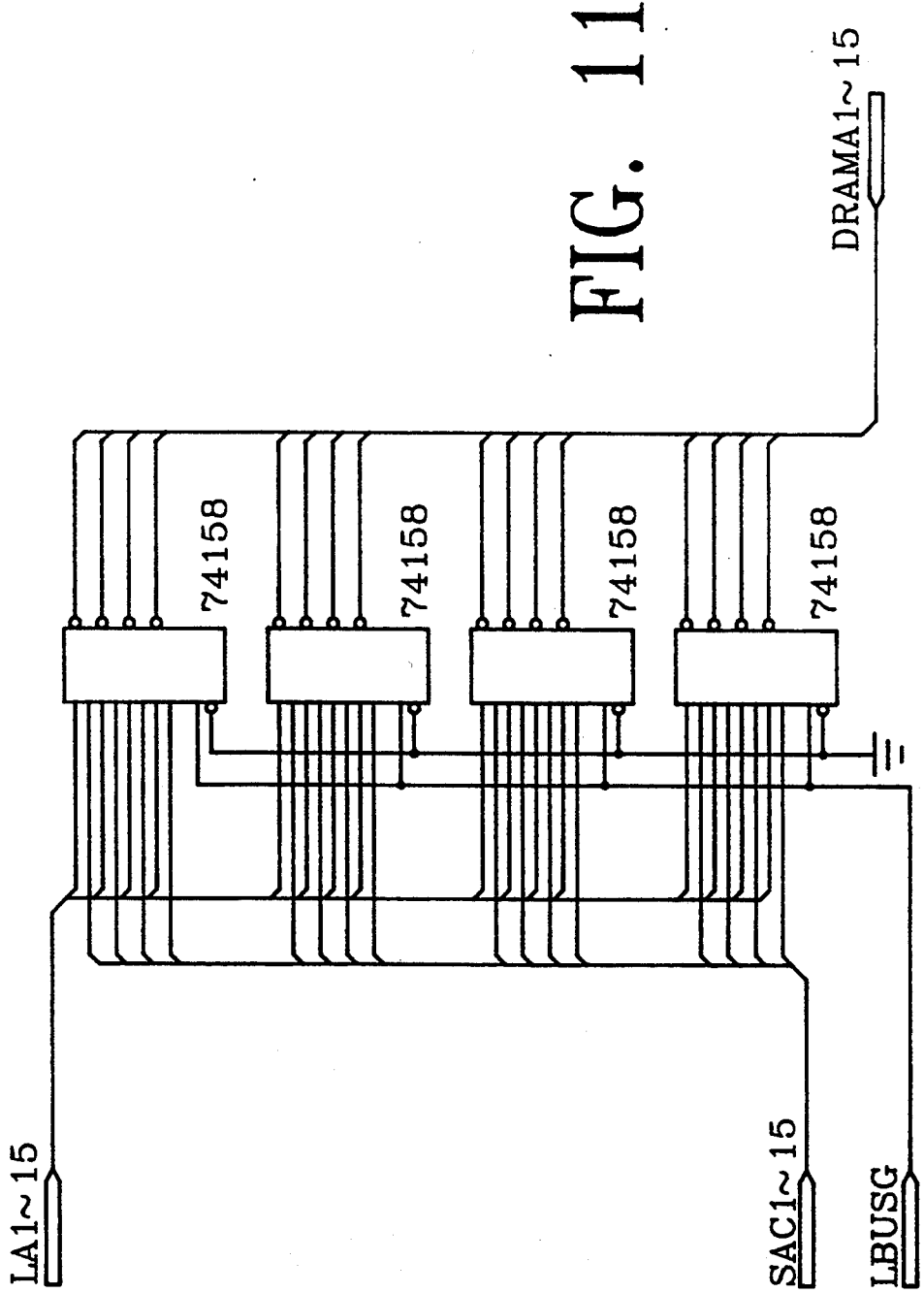
FIG. 11 is a circuit diagram showing the address line generation circuit of the DPRAM of the present invention.

The DPRAM has an address generation circuit comprising four multiplexers, IC No. 74158, as shown in FIG. 11. The PC BUS address lines SA1–SA15 and the CPU latching address lines LA1–LA15 are respectively connected to two sets (A and B) of input pins of the multiplexers 74158. The LBUSG signal is used to select set A or B of the multiplexers 74158. When the LBUSG is in low state, set A, LA1–LA15, is selected, otherwise set B, SA1–SA15, is selected. The output of the multiplexers 74158 is the address line signal DRAMA1–DRAMA15 of the DPRAM.

Figure 12:
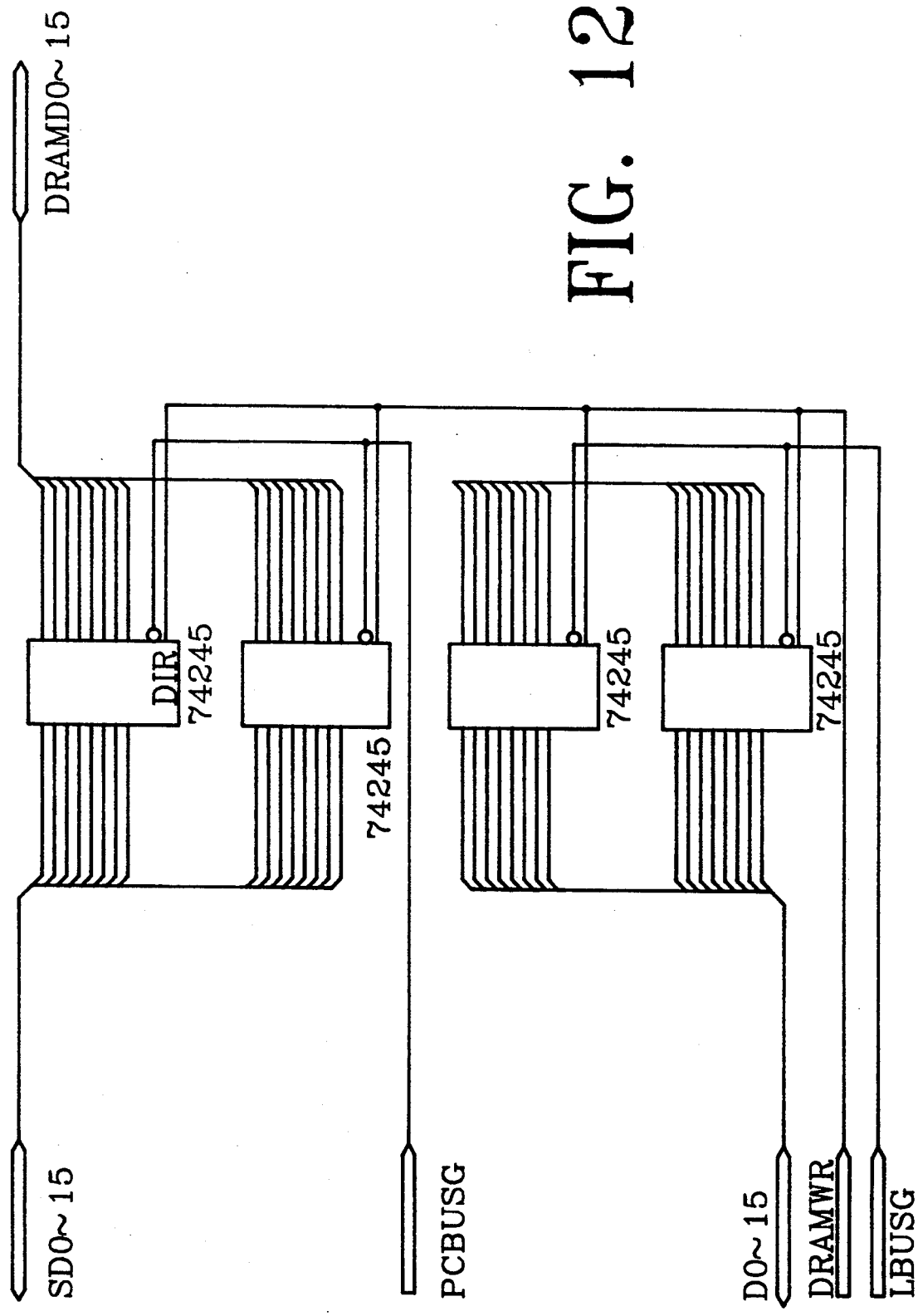
FIG. 12 is a circuit diagram showing the data line generation circuit of the dynamic random access memory (DRAM) of the present invention.
Figure 13:
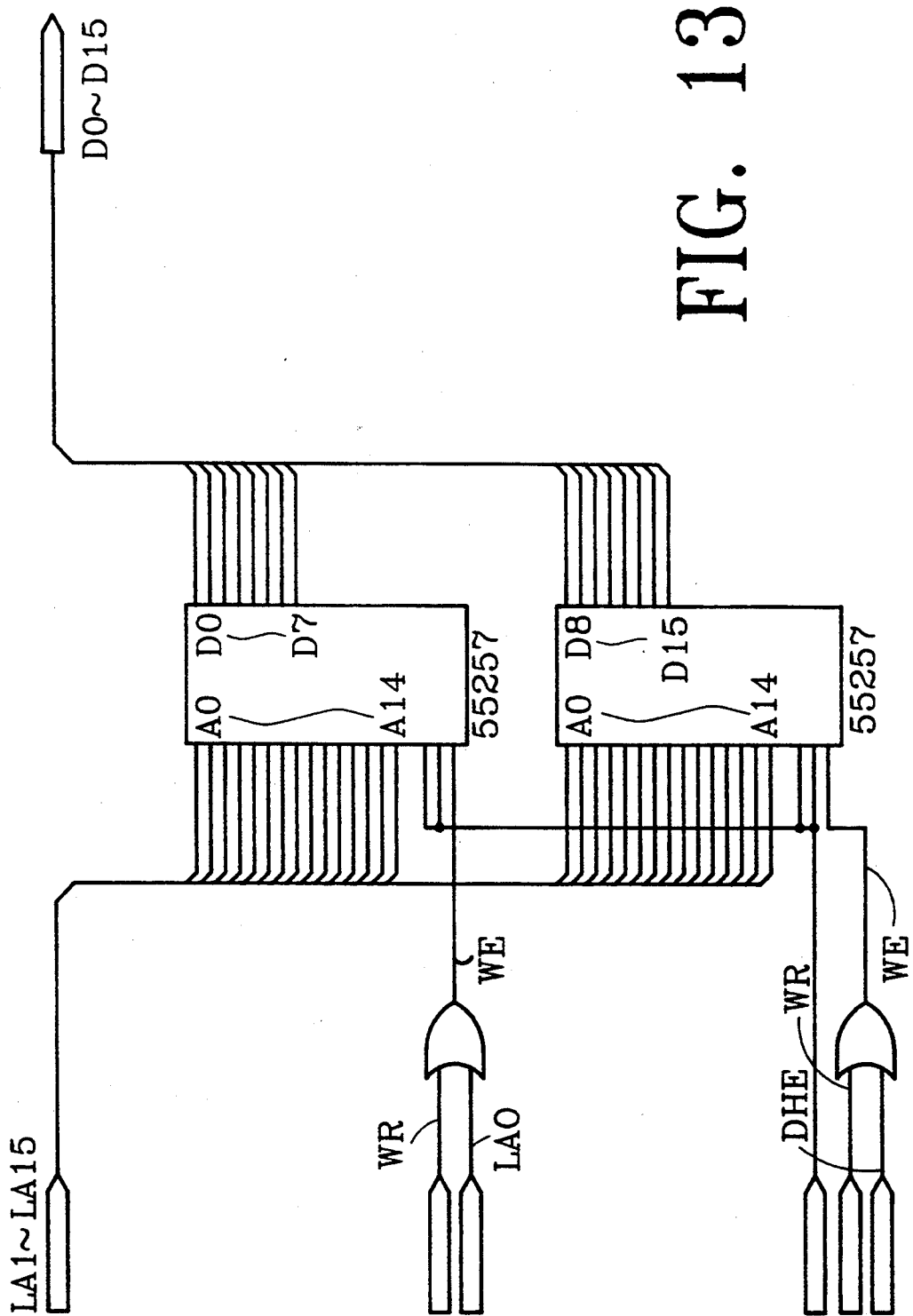
FIG. 13 and 14 are circuit diagrams showing the data line generation circuits of the DRAM of the present invention.

The data line signal of the DPRAM is generated by four tri-state transceivers 74245, as shown in FIG. 12. The PC BUS has a data bus, SD0–SD15, connected to two of the tri-state transceivers 74245, of which the output is controlled by the PCBUSG. When the request of the PC BUS is accepted, the data bus of the personal computer is allowed to connect to the data lines of the DPRAM. The data bus of the CPU is handled by a set of tri-state transceivers 74245 so that when the access of the CPU to the DPRAM is accepted, the LBUSG becomes low state and the data lines D0–D15 are connected to the DPRAM. The transmission direction of data is determined by the LGUSG signal.

DUART CIRCUIT

Figure 14:
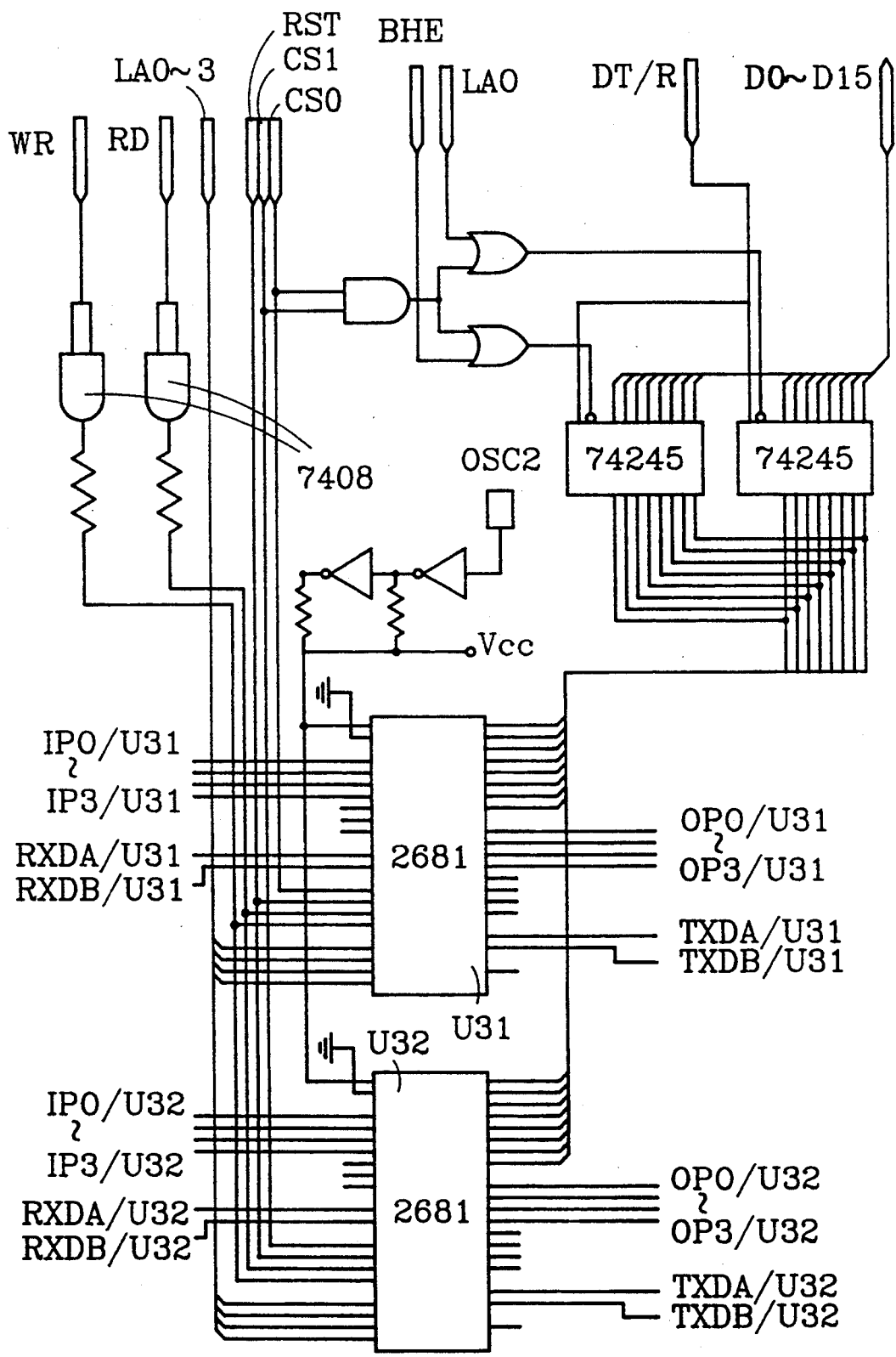

As shown in FIG. 14, wherein the DUART circuit is shown, the DUART circuit comprises two DUARTs, IC No. 2681, which are designated by U31 and U32 in the figure to provide receipt and transmission of series signals. Each of the two DUARTs has two series ports. The communication protocol of each of the series ports can be set individually. A quartz oscillator OSC2 which provides a frequency of 3.6864 MHz is used to generate a baud rate of 50–38400 bps. Since the oscillator has to drive two DUARTs, it is provided with two stages of invertors to amplify the output thereof. Similarly, the WR and RD signals provided by the CPU are respectively transmitted through an AND gate, IC No. 7408, for the same purpose of amplification.

The data line of the DUART contains only 8 bits and therefore the 16-bit data bus of the CPU has to be divided into a high byte portion and a lower byte portion which are separately applied to the DUARTs via two tri-state transceivers, IC No. 74245. The high byte signal is decoded in accordance with the following equation:

BYTE.HIGH=(DUARTCS0 AND DUARTCS1) OR BHE

While the low byte signal is decoded in accordance with the following equation:

BYTE_LOW = (DUARTCS0 AND DUARTCS1) OR LA0

Figure 15:
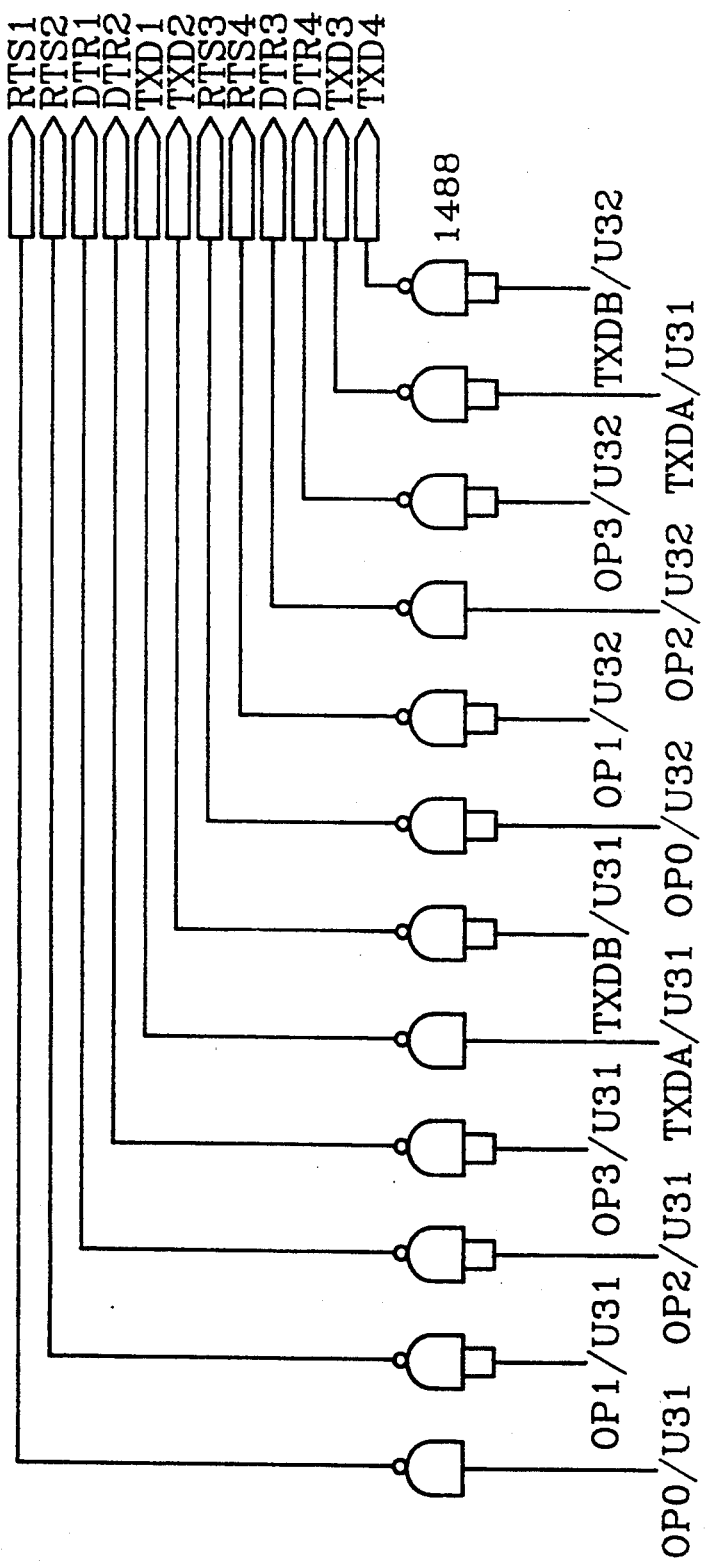
FIG. 15 is a circuit diagram for converting the TXD, RTS and DTR output signals of the present invention with a 1488 voltage regulator chip from TTL (transistor-transistor logic) signals to standard RS232 signals.
Figure 16:
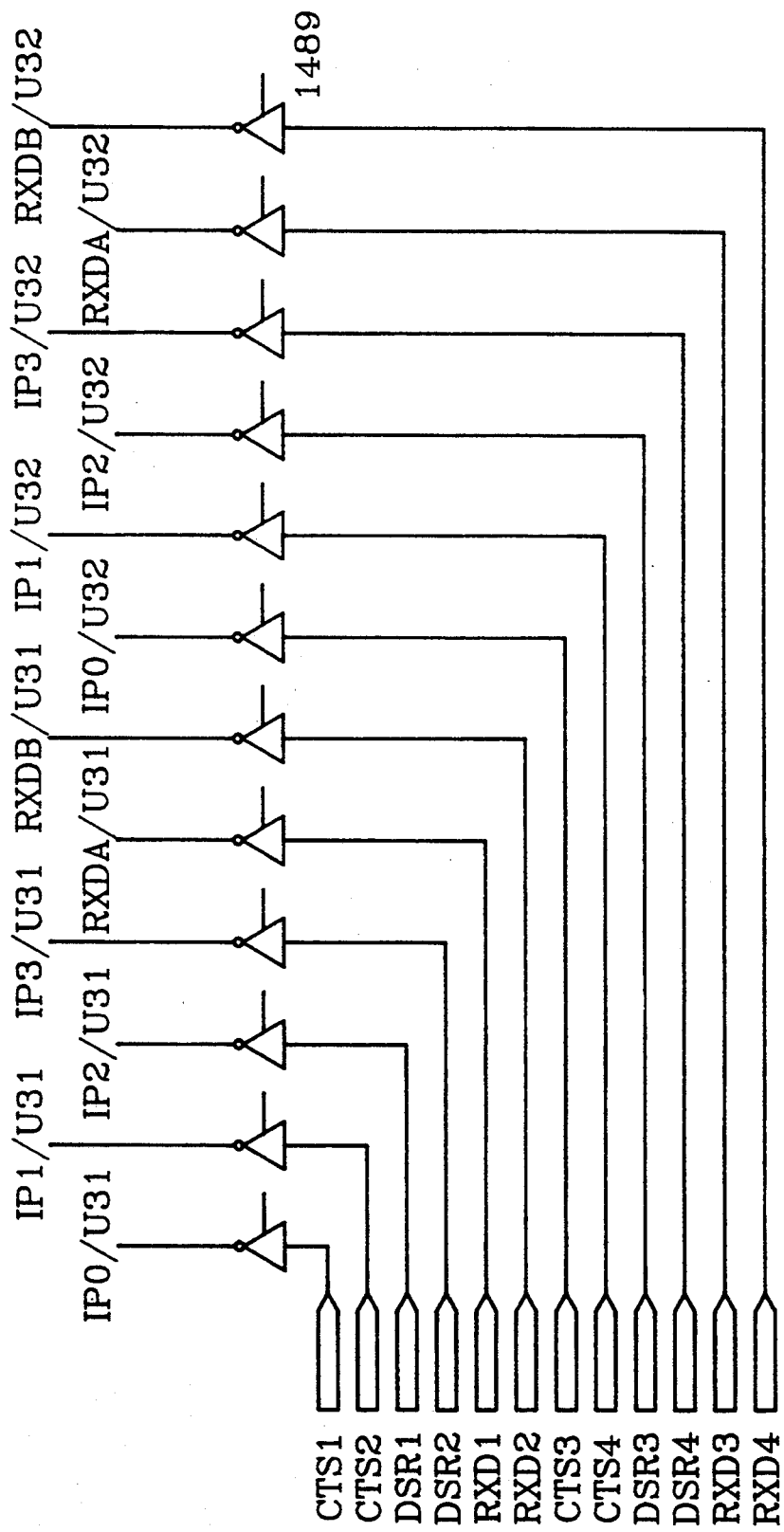
FIG. 16 is a circuit diagram for converting the RXD, CTS and DSR input signals of the present invention with a 1489 voltage regulator chip from standard RS232 signals to 5 V level TTL signals.
Figure 17:
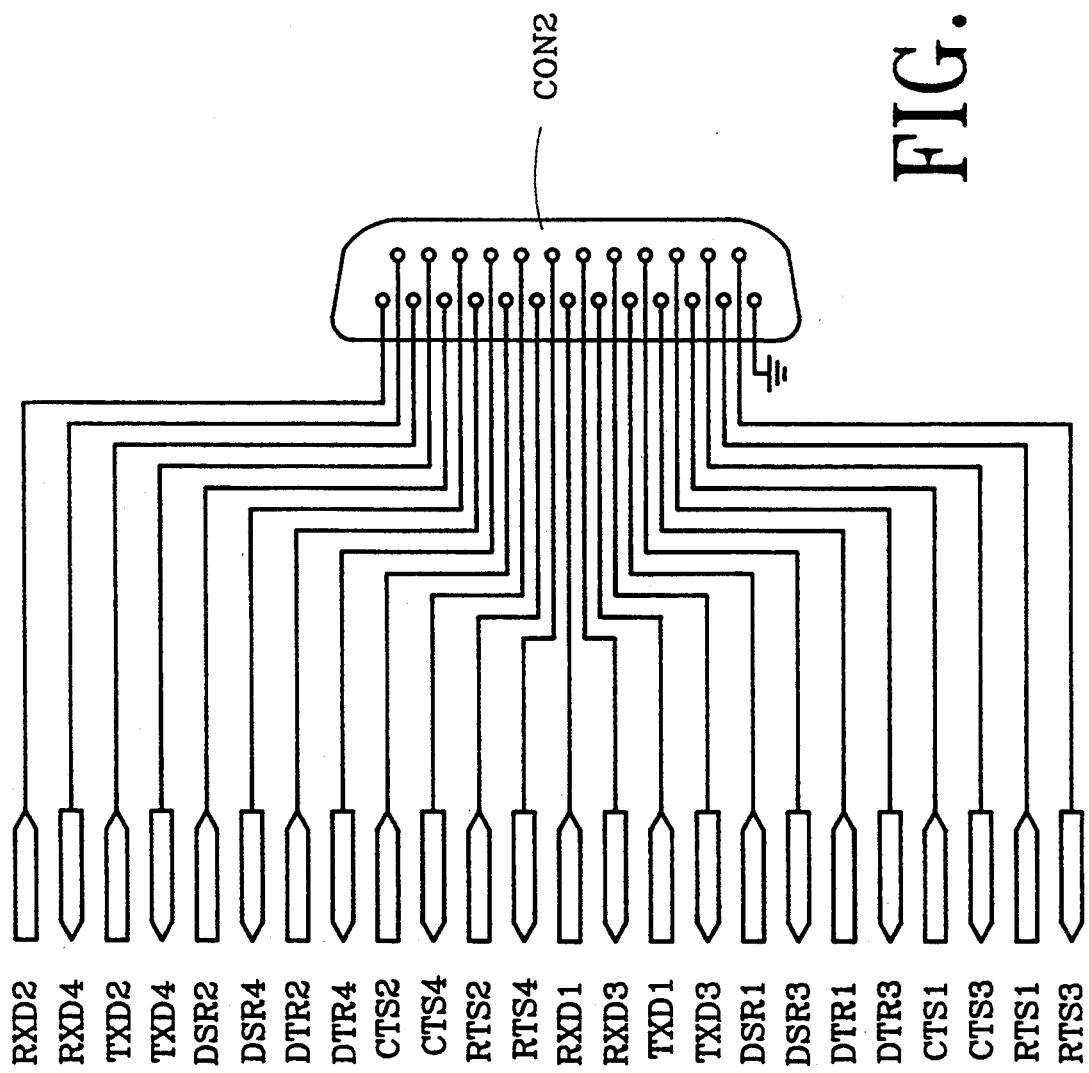
FIG. 17 is a circuit diagram showing the connector used to connect the signals of FIGS. 15 and 16.

Each of the series ports uses six signal lines including RXD, TXD, DTR, DSR, CTS and RTS among which TXD, RTS and DTR are output lines which are respectively connected to a NAND gate. IC No. 1488, to transfer the signals which are in TTL standard into RS232 standard signals. This is shown in FIG. 15. the RXD, CTS and DSR lines are respectively connected to an invertor, IC No. 1489, to convert signals of 12 V RS232 standard into signals of 5 V TTL standard signals. This is shown in FIG. 16. As shown in FIG. 17, all these signal lines are connected to a connector CON2.

It is apparent that although the invention has been described in connection with the preferred embodiment, it is contemplated that those skilled in the art may make changes to certain features of the preferred embodiment without altering the basic concept of the invention and without departing from the spirit and scope of the invention as defined in the appended claims.

What is claimed is:

1. A digital measuring device comprising:
   a computer containing a computer bus means;
   a signal conversion means in the form of a multiplexer;
   communication interface means electrically connected to said computer for receiving digital measurement signals provided by a number of measurement tools via said signal conversion means;
   said signal conversion means having a plurality of signal ports for respectively connecting with said measurement tools, said signal conversion means being adapted to receive said digital measurement signals from said measurement tools, convert said digital measurement signals into system recognizable output signals, and send said system recognizable output signals to said communication interface means to be accessed and processed by said computer;
   wherein said communication interface means comprising:
   a central processing unit;
   an erasable programmable read only memory circuit means connected to said central processing unit for storing therein system operation software to be executed in said central processing unit, said system operation software comprising at least a boot error detection program and a peripheral chip parameter initialization program;
   a program static random access memory circuit means connected to said central processing unit for providing a data storage space accessible by said central processing unit;
   a dual port random memory circuit means connected to said central processing unit for providing a common storage space to be used by said central processing unit and said bus means of said computer, said dual port random access memory circuit means comprising an external register means to be written with first information by said central processing unit, a selector means for providing second information, and a decoder means; said decoder means comparing said first information with said second information to allow said computer bus means to access said dual port random access memory in a direct access manner, said dual port random access memory circuit means further comprising a determination circuit for determining a priority of access between said computer bus means and said central processing trait to said dual port random access memory means; and
   a dual universal asynchronous receiver-transmitter circuit means also connected to said central processing unit, said dual universal asynchronous receiver-transmitter circuit means having a plurality of serial ports for independently receiving said system-recognizable output signals from said signal conversion means and transmitting second output signals to said computer.

2. A digital measurement device as claimed in claim 1, wherein said signal conversion means comprises at least four signal ports to respectively receive the digital measurement signal from each of four measurement tools.

3. A digital measurement device as claimed in claim 2, wherein the four measurement tools comprise a vernier calliper, an inside calliper, an outside calliper and a height gage.

* * * * *